United States Patent
Chetuparambil et al.

(10) Patent No.: US 8,527,711 B2
(45) Date of Patent: Sep. 3, 2013

(54) METHOD AND SYSTEM TO PREVIEW NEW CACHEABLE CONTENT

(75) Inventors: Madhu K. Chetuparambil, Raleigh, NC (US); Ching-Chi A. Chow, Cary, NC (US); Darl Crick, Keswick (CA); Andrew J. Ivory, Durham, NC (US); Nirmala Kodali, Glen Allen, VA (US)

(73) Assignee: International Business Machines Corporation, Armonk, NY (US)

( * ) Notice: Subject to any disclaimer, the term of this patent is extended or adjusted under 35 U.S.C. 154(b) by 1254 days.

(21) Appl. No.: 11/616,403

(22) Filed: Dec. 27, 2006

(65) Prior Publication Data
US 2008/0162815 A1 Jul. 3, 2008

(51) Int. Cl.
*G06F 13/16* (2006.01)
(52) U.S. Cl.
USPC ............ 711/138; 711/118; 711/137; 711/213
(58) Field of Classification Search
USPC .................................. 711/138, 118, 137, 213
See application file for complete search history.

(56) References Cited

U.S. PATENT DOCUMENTS

| | | | |
|---|---|---|---|
| 5,623,630 A | 4/1997 | Kisuki | |
| 6,467,028 B1 | 10/2002 | Kelley | |
| 6,587,928 B1 | 7/2003 | Periyannan et al. | |
| 6,867,782 B2 | 3/2005 | Gaudette et al. | |
| 6,922,754 B2 * | 7/2005 | Liu et al. | 711/138 |
| 2003/0058277 A1 * | 3/2003 | Bowman-Amuah | 345/765 |
| 2004/0186733 A1 * | 9/2004 | Loomis et al. | 704/278 |
| 2004/0205633 A1 | 10/2004 | Martinez et al. | |
| 2005/0022128 A1 | 1/2005 | Nicholas et al. | |
| 2006/0259540 A1 * | 11/2006 | Bernabeu-Auban et al. | 709/202 |
| 2007/0073833 A1 * | 3/2007 | Roy et al. | 709/217 |

* cited by examiner

*Primary Examiner* — Jae Yu
(74) *Attorney, Agent, or Firm* — Charles L. Moore; Moore & Van Allen PLLC

(57) ABSTRACT

A method to preview new cacheable content may include adding a skip-cache element to a request to preview the new cacheable content before replacing any existing content in a cache or caching the new content. The method may also include bypassing cache processing for the request in response to the request including the skip-cache element and the skip-cache element being defined in a cache policy.

21 Claims, 2 Drawing Sheets

METHOD AND SYSTEM TO PREVIEW NEW CACHEABLE CONTENT

BACKGROUND OF THE INVENTION

The present invention relates to adding new cacheable content to a production system, and more particularly to a method and system to preview cacheable content using a predetermined request context.

It is common for applications operating on a production system, such as an e-commerce system or other business related system, to add new cacheable content into the production system. The new cacheable content typically replaces existing content. To avoid data integrity issues and other processing issues, the new content should not be processed by the cache until it has been previewed and verified or validated.

There are a number of mechanisms for previewing new content. One solution is to remove cache configuration for the page or content before making the preview request. This solution, however, will cause the existing page or content that shares the same cache configuration with the new content to not be processed by the cache as well. Accordingly, any users will be unable to access the existing content while the cache configuration is removed and the new content is being verified.

Another solution is to invalidate the cached page or content before and after the preview request is made. A drawback to this solution is the potential for a timing window for previewing content being served from the cache before the invalidation occurs and a user attempting to access the original content. This could also place extra workload on a system when the invalidated existing page or content is requested since the system will need to regenerate the page or content and place it in the cache.

BRIEF SUMMARY OF THE INVENTION

In accordance with an embodiment of the present invention, a method to preview new cacheable content may include adding a skip-cache element to a request to preview the new cacheable content before replacing any existing content in a cache or caching the new content. The method may also include bypassing cache processing for the request in response to the request including the skip-cache element and the skip-cache element being defined in a cache policy. This may allow the new content to be previewed and the existing content to be servered as the existing content was before.

In accordance with another embodiment of the present invention, a system to preview new cacheable content may include a server and a cache associated with the server. The system may also include a module to add a skip-cache element to a request to preview the new cacheable content before replacing any existing content in the cache or caching the new cacheable content.

In accordance with another embodiment of the present invention, a computer program product to preview new cacheable content may include a computer usable medium having computer usable program code embodied therein. The computer usable medium may include computer usable program code configured to add a skip-cache element to a request to preview the new cacheable content before replacing any existing content in a cache or caching the new content. The computer useable medium may also include computer usable program code configured to bypass cache processing for the request in response to the request including the skip-cache element and the skip-cache element being defined in a cache policy.

Other aspects and features of the present invention, as defined solely by the claims, will become apparent to those ordinarily skilled in the art upon review of the following non-limited detailed description of the invention in conjunction with the accompanying figures.

DETAILED DESCRIPTION OF THE INVENTION

Figure 1:
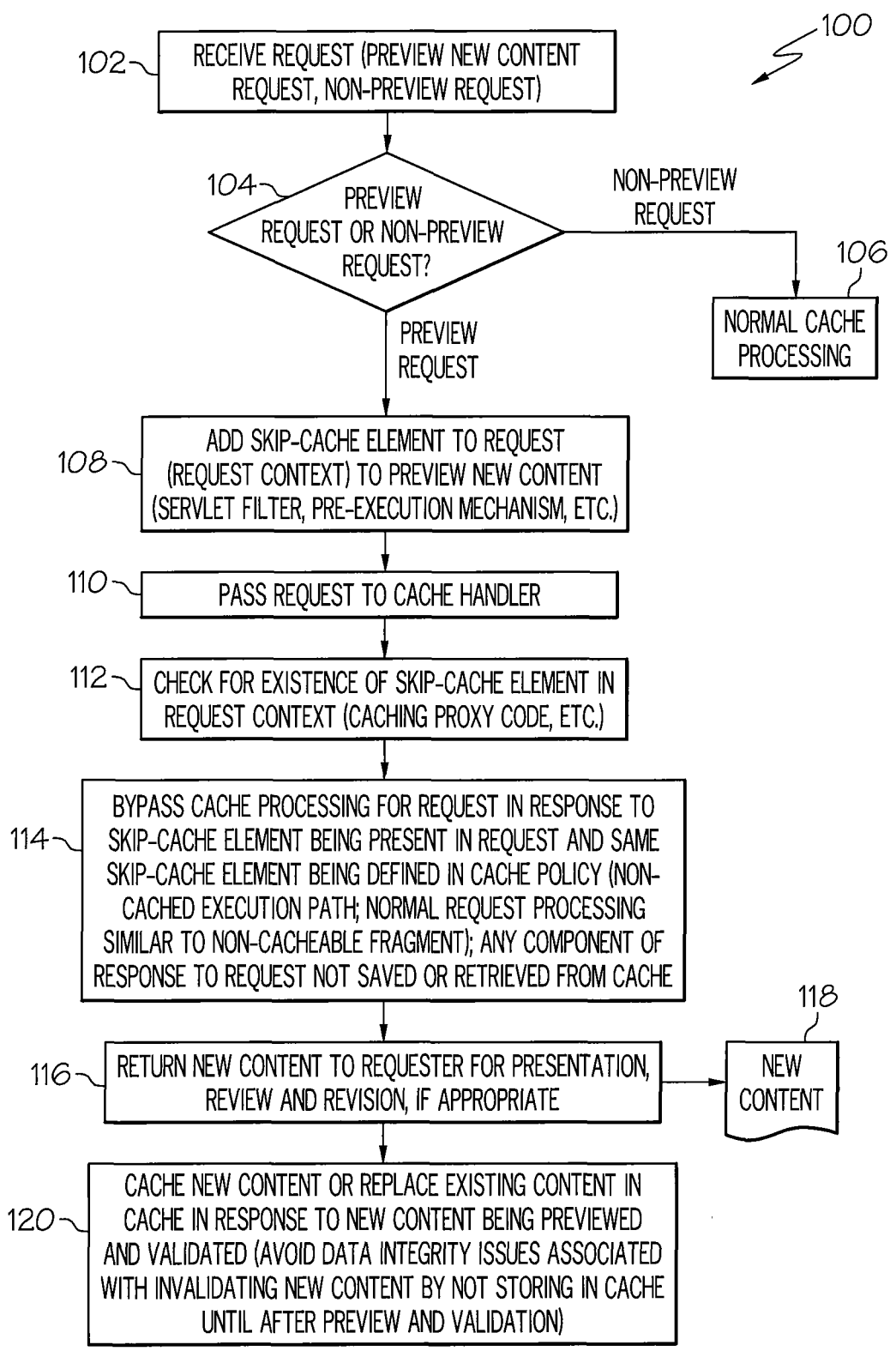
FIG. 1 is a flow chart of an example of a method to preview cacheable content in accordance with an embodiment of the present invention.

The following detailed description of embodiments refers to the accompanying drawings, which illustrate specific embodiments of the invention. Other embodiments having different structures and operations do not depart from the scope of the present invention.

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium, such as for example medium 228 in FIG. 2, having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency (RF) or other means.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a flow chart of an example of a method 100 to preview cacheable content in accordance with an embodiment of the present invention. In block 102, a request may be received. The request may be a preview request to preview new content before caching the content or replacing existing content in a cache, or the request may be a non-preview request for some other information, content, service or other purpose. The request may be received by a server, web server, application server or the like from a client.

In block 104, a determination may be made if the request is a preview request or a non-preview request. If the request is a non-preview request, the method 100 may advance to block 106. In block 106, the request may be processed by normal cache processing. Accordingly, the present invention permits normal cache processing of non-preview requests while the new cacheable content is being previewed and verified and until the existing cache content is replaced by the new cacheable content. Other requests for the existing content can continue while the preview occurs and users viewing the existing content will not impacted.

If the request is a preview request in block 104, the method 100 may advance to block 108. In block 108, a skip-cache element may be added to the request or the request context. The skip-cache element may be code, such as a caching proxy code or other code to cause cache processing to be bypassed as described herein. The skip-cache element may be added by a servlet filter, a pre-execution mechanism to set or incorporate the skip-cache element before the preview request is executed, or by another mechanism capable of adding the appropriate code.

In block 110, the request may be passed to a cache handler. In block 112, the cache handler may check for presence of the skip-cache element in the request context. In block 114, cache processing may be bypassed for the request in response to the skip-cache element being present in the request context and the same skip-cache element being defined in the cache policy. The request may be processed using a non-cached execution path or following a normal request flow similar to a non-cacheable fragment. Any component of the response to the preview request may not be saved or retrieved from the cache.

In block 116, the new content 118 may be returned to a requester for presentation, review and revision, if appropriate or needed. In block 120, the new content may be cached or may replace existing content in the cache in response to the new content being previewed and validated or verified. Data integrity issues or similar issues associated with invalidating the new content may be avoided by previewing and validating or verifying the new content before caching or replacing any existing content.

Figure 2:
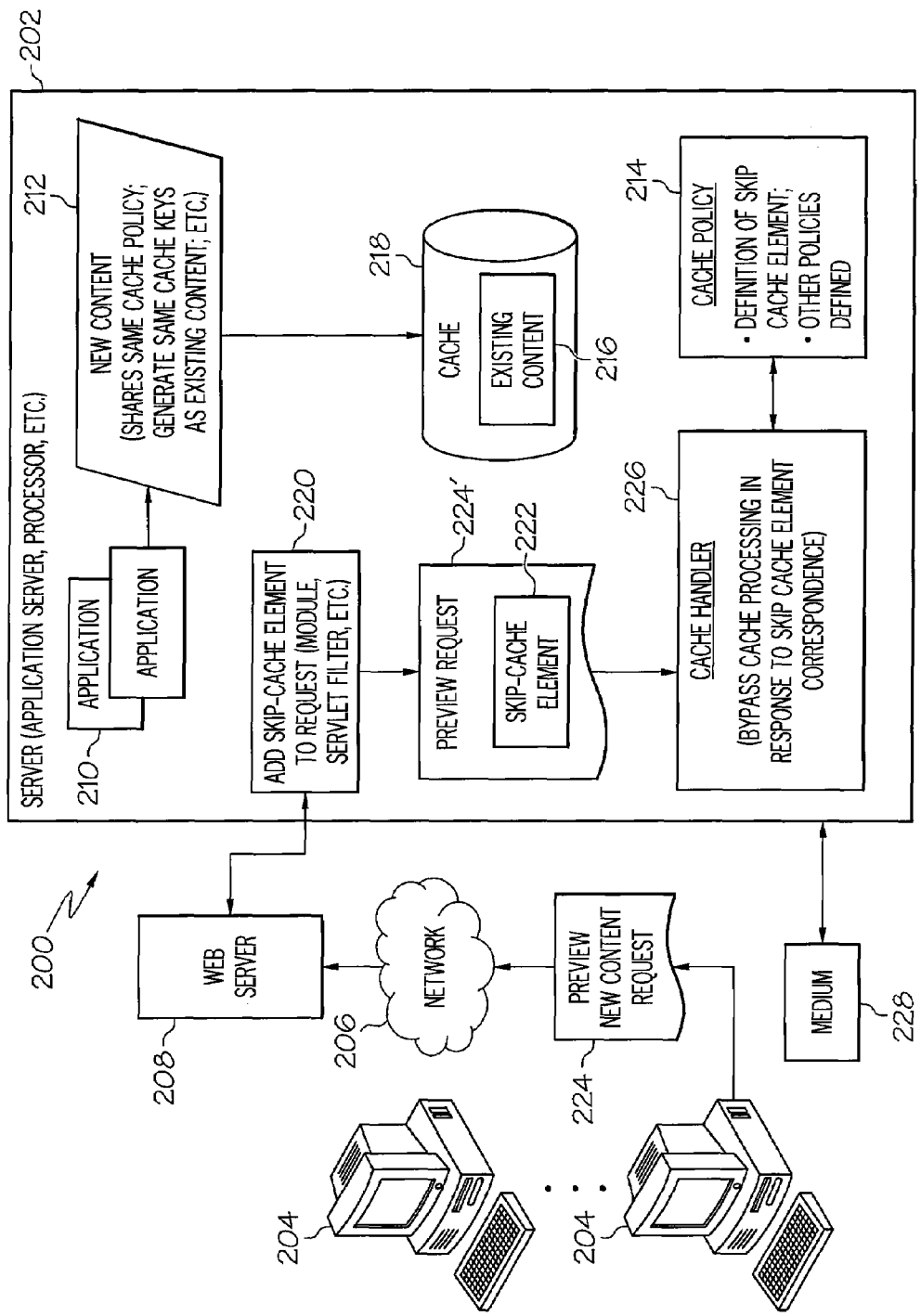
FIG. 2 is a block diagram of an example of a system to preview cacheable content in accordance with an embodiment of the present invention.

FIG. 2 is a block diagram of an example of a system 200 to preview cacheable content in accordance with an embodiment of the present invention. The method 100 of FIG. 1 may be embodied in the system 200. The system 200 may include a server 202. The server 202 may be a web server, application server or other type server or processor. The server 202 may be used in e-commerce or other business related function. The server 202 may be accessed by one or more clients 204 via a network 206. The network 206 may be the Internet, intranet or other private, secure or special purpose network. A web server 208 or other gateway device may be associated with the server 202 to interface with the network 206.

One or more applications 210 may run or operate on the server 202. Each application 210 may be capable of creating new cacheable content 212. The new cacheable content 212 may share the same cache policy 214 as a portion of existing content 216 in a cache 218 and may generate the same cache keys as the portion of existing content 216.

A module 220 may be adapted to add a skip-cache element 222 to a request 224 or request context to preview the new cacheable content 212. The preview new content request 224 may be requested by one of the clients 204 via the network 206 and web server 208. The module 220 to add the skip-cache element 222 may include a servlet filter, a pre-execution mechanism, or other mechanism capable of adding the appropriate code to the context of the preview request 224.

The server 202 may also include a cache handler 226. The preview request 224' including the skip-cache element 222 may be passed to the cache handler 226. The cache handler 226 may check for the presence of the skip-cache element 222 in the request context 224'. The cache handler 226 will bypass cache processing and return the cacheable content to the client 204 in response to the skip-cache element 222 being present in the request 224' and the same skip-cache element 222 being defined in the cache policy 214.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method to preview new cacheable content, comprising:
    adding a skip-cache element to a request to preview the new cacheable content before replacing any existing content in a cache or caching the new content, the skip-cache element comprising code that becomes part of the request to preview the new cacheable content in response to adding the skip-cache element to the preview request; and
    bypassing cache processing for the request in response to the request including the skip-cache element and a same skip-cache element being defined in a cache policy.

2. The method of claim 1, further comprising defining the skip-cache element as a property in the cache policy.

3. The method of claim 1, further comprising preventing any component of a response to the request from being saved.

4. The method of claim 1, further comprising preventing any component of a response to the request from being retrieved from the cache.

5. The method of claim 1, further comprising performing normal cache processing in response to a non-preview request.

6. The method of claim 1, further comprising allowing any existing cache content using a same cache policy as the new cacheable content to be processed by the cache until the new cacheable content has been previewed and permitted to replace any existing cache content.

7. The method of claim 1, further comprising preventing any data integrity issues associated with invalidating the new cacheable content by not storing the new cacheable content in the cache until the new cacheable content has been previewed and permitted to replace any existing cache content.

8. The method of claim 1, further comprising replacing any existing cache content with the new cacheable content in response to previewing and validating the new cacheable content.

9. The method of claim 1, further comprising performing a non-cached execution of the request in response to the request including the skip-cache element and a same skip-cache element being defined in the cache policy.

10. A system to preview new cacheable content, comprising:
    a server;
    a cache associated with the server; and
    a module to add a skip-cache element to a request to preview the new cacheable content before replacing any existing content in the cache or caching the new cacheable content, the skip-cache element comprising code that becomes art of the request to preview the new cacheable content in response to adding the skip-cache element to the preview request.

11. The system of claim 10, further comprising a cache policy including a definition of the skip-cache element.

12. The system of claim 11, further comprising a cache handler adapted to check for presence of the skip-cache element in the request and to bypass cache processing for the request in response to the request including the skip-cache element and the skip-cache element being defined in the cache policy.

13. The system of claim 10, wherein the module to add the skip-cache element comprises a servlet filter.

14. The system of claim 10, wherein the new cacheable content shares a same cache policy with any existing content to be replaced by the new cacheable content.

15. A computer program product to preview new cacheable content, the computer program product comprising:
    a computer readable storage medium device that is not a signal propagating medium having computer usable program code embodied therein, the computer usable medium comprising:
    computer usable program code configured to add a skip-cache element to a request to preview the new cacheable content before replacing any existing content in a cache or caching the new content, the skip-cache element comprising code that becomes part of the request to preview the new cacheable content in response to adding the skip-cache element to the preview request; and
    computer usable program code configured to bypass cache processing for the request in response to the request including the skip-cache element and a same skip-cache element being defined in a cache policy.

16. The computer program product of claim 15, wherein the computer usable medium further comprises:
    computer usable program code configured to preventing any component of a response to the request from being saved; and
    computer usable program code configured to prevent any component of the response to the request from being retrieved from the cache.

17. The computer program product of claim 15, wherein the computer usable medium further comprises computer usable program code configured to perform normal cache processing in response to a non-preview request.

18. The computer program product of claim 15, wherein the computer usable medium further comprises computer usable program code configured to allow any existing cache content using a same cache policy as the new cacheable content to be processed by the cache until the new cacheable content has been previewed and permitted to replace any existing cache content.

19. The computer program product of claim 16, wherein the computer usable medium further comprises computer usable program code configured to prevent the new cacheable content from being cached until the new cacheable content has been previewed and permitted to replace any existing cache content.

20. The computer program product of claim 16, wherein the computer usable medium further comprises computer usable program code configured to perform a non-cached execution of the request in response to the request including the skip-cache element and a same skip-cache element being defined in the cache policy.

21. A method to preview new cacheable content, comprising:

receiving a request to one of add new content to a cache, or replace existing content in the cache with the new content;

determining if the request comprises a preview request to preview the new content before caching or a non-preview request;

processing the request for caching the new content in response to the request comprising the non-preview request;

adding a skip-cache element to the request in response to the request comprising a preview request to preview the new cacheable content before replacing any existing content in the cache or caching the new content, the skip-cache element comprising code that becomes part of the request to preview the new cacheable content in response to adding the skip-cache element to the preview request;

bypassing cache processing for the request in response to the request including the skip-cache element and a same skip-cache element being defined in a cache policy;

returning the new content to a requester for review of the new content in response to bypassing cache processing for the request; and caching the new content or replacing the existing content in the cache in response to the new content being reviewed and validated.

* * * * *